United States Patent

Kabe et al.

[11] Patent Number: 4,469,158
[45] Date of Patent: Sep. 4, 1984

[54] PNEUMATIC TIRE

[75] Inventors: Kazuyuki Kabe; Tsuneo Morikawa, both of Hiratsuka, Japan

[73] Assignee: The Yokohama Rubber Co., Ltd., Tokyo, Japan

[21] Appl. No.: 330,825

[22] Filed: Dec. 15, 1981

[30] Foreign Application Priority Data

Dec. 29, 1980 [JP] Japan .................... 55-188603

[51] Int. Cl.³ ............................ B60C 9/04; B60C 9/20
[52] U.S. Cl. ............................ 152/354 R; 152/356 R; 152/361 R
[58] Field of Search ............ 152/354 R, 354 RB, 355, 152/356 R, 356 A, 357-359, 361 R, 361 FP, 361 DM

[56] References Cited

U.S. PATENT DOCUMENTS

| 3,126,042 | 3/1964 | Cegnar | 152/361 DM |
| 3,961,657 | 6/1976 | Chrobak | 152/355 |
| 4,258,774 | 3/1981 | Mirtain et al. | 152/361 FP |
| 4,387,755 | 6/1983 | Kato et al. | 152/356 R |

Primary Examiner—Lois E. Boland
Attorney, Agent, or Firm—Armstrong, Nikaido, Marmelstein & Kubovcik

[57] ABSTRACT

A pneumatic tire is disclosed which comprises a tread, a carcass cord layer and at least two belt reinforcing layers disposed between the tread and the carcass cord layer, wherein the reinforcing cord of one of the belt reinforcing layers has an angle of 15° to 30° with respect to the circumferential direction of the tire and the reinforcing cord of the other makes an angle of 150° to 165° to the circumferential direction. The carcass cord layer consists of only one layer and the reinforcing cord thereof makes an angle of 66° to 82° with respect to the circumferential direction of the tire.

4 Claims, 10 Drawing Figures

PNEUMATIC TIRE

BACKGROUND OF THE INVENTION

This invention relates to a pneumatic tire, and more particularly, to a pneumatic radial tire which is capable of reducing the ply steer remarkably in pneumatic tires and which has an improved straight driving performance.

The conventional radial tires for cars generally have a construction in which at least two belt reinforcing layers are disposed between a tread and a carcass cord layer substantially parallel to the circumferential direction of the tire, whereby the reinforcing cord of one of the belt reinforcing layers has an angle of 15 to 30 degrees with respect to the tire circumferential direction while the reinforcing cord of the other of the belt reinforcing layers has an angle of 150 to 165 degrees with respect to the tire circumferential direction, the reinforcing cords cross each other, and the carcass cord layer consists of a single or two layers with the cord of each layer describing an angle of about 90° with respect to the tire circumferential direction. When compared with bias tires, the radial tires of this kind have better braking performance, fuel consumption and wear resistance due to the effects brought forth by the belt reinforcing layers, but have the shortcoming that straight driving performance is inferior due to the belt reinforcing layers. Namely, as the radial tire rolls forward, there is a lateral force either to the right or left relative to the travelling direction even if the slip angle is zero, and this lateral force leads the car in a different direction than that intended by the driver.

Generally, the lateral force at the zero slip angle consists of force components that are generated by two different mechanisms. One is referred to as "conicity" (CT) and the other, "ply steer" (PS), and they are classified as parts of the uniformity characteristics of the tire. In accordance with the uniformity test method (JASO C607) for car tires, the conicity CT and the ply steer PS can be expressed by the following equations from their definition in conjunction with LFD, LFDw and LFDs, wherein LFD represents the mean value of the lateral force when the tire rotates once, LFDw is the value measured on the front side and LFDs is the value measured when the tire is turned inside out.

$$LFDw = PS + CT \quad (1)$$

$$LFDs = PS - CT \quad (2)$$

PS and CT can be given as follows from the above equations (1) and (2):

$$CT = (LFDw - LFDs)/2 \quad (3)$$

$$PS = (LFDw + LFDs)/2 \quad (4)$$

The relation of these equations (1) through (4) can be expressed such as in FIG. 1.

Of the conicity and ply steer, the conicity is believed to result from the fact that the tire shape is geometrically asymmetric about the center of the circumferential direction of the tire, or to be the force that is generated when the tire, which is in the form like a circular truncated cone, rotates. Since the conicity is primarily affected by the positions of the belt reinforcing layers inserted into the tread of the tire, it can be reduced by any improvements made in or relating to the tire production. By contrast, the ply steer is a peculiar force resulting from the structure of the belt reinforcing layers and hence, it has been believed substantially difficult to markedly reduce the ply steer unless the structure itself of the belt reinforcing layers is changed.

Now, the belt reinforcing layer will be discussed in particular. The belt reinforcing layer can be expressed as a two-layered laminate sheet 50 consisting of belt reinforcing layers 50u and 50d, such as depicted in FIG. 2(A). It is well known that when a tensile force is permitted to act upon this two-layered laminate sheet 50 in the tire circumferential direction EE', the two-layered laminate sheet 50 undergoes deformation not only inside the two-dimensional plane in which the tensile force acts, but also three-dimensionally outside the plane, until at last it undergoes torsional deformation as depicted in FIG. 2(B). The ply steer results from this torsional deformation of the belt reinforcing layer.

Various attempts have been made in the past to reduce ply steer by adding a new belt reinforcing layer to the existing belt reinforcing layers, but the addition of a new belt reinforcing layer deteriorates the effects of the radial tire such as low fuel consumption, increases the tire weight, lowers the efficiency and raises the cost of the tire production, and it is not entirely preferable.

SUMMARY OF THE INVENTION

It is an object of the present invention to provide a pneumatic radial tire capable of improving the straight driving performance of a car by reducing the ply steer.

It is another object of the invention to provide a pneumatic radial tire capable of improving the straight driving performance of a car with a minimal number of belt reinforcing layers and without calling for the addition of a large number of new belt reinforcing layers, by optimizing the angle of disposition of the reinforcing cords in the carcass cord layer.

It is still another object of the present invention to provide a pneumatic radial tire capable of improving the driving comfort and maneuverability of a car.

The pneumatic tire to accomplish these objects of the invention comprises a tread, a carcass cord layer and at least two belt reinforcing layers disposed between the tread and the carcass cord layer, whereby the reinforcing cord of one of the belt reinforcing layers has an angle of 15 to 30 degrees with respect to the circumferential direction of the tire, the belt cord of the other of the belt reinforcing layers has an angle of 150 to 165 degrees with respect to the tire circumferential direction, the carcass cord layer consists of only one layer, and the reinforcing cord of this carcass cord layer has an angle of 66 to 82 degrees with respect to the tire circumferential direction when measured from the side in which the reinforcing cord of the belt reinforcing layer adjacent the carcass cord layer has an acute angle with respect to the tire circumferential direction.

These and other objects and advantages of the present invention will become apparent from the following description, taken in conjunction with the accompanying drawings.

DESCRIPTION OF THE PREFERRED EMBODIMENTS

Figure 1:
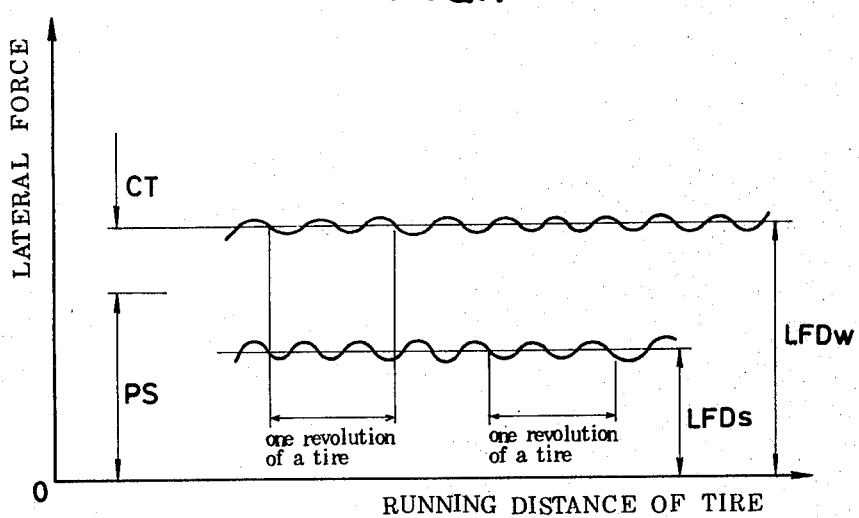
FIG. 1 is a diagram showing the relationship between the running distance of the radial tire and the lateral force.
Figure 2:
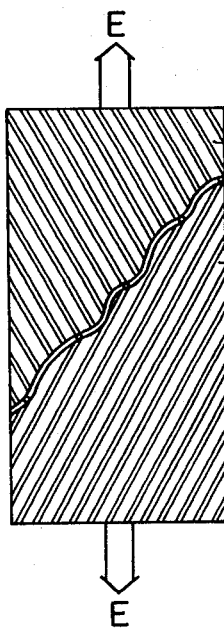
FIGS. 2(A) and 2(B) are models, each showing the state of deformation of the belt reinforcing layer.
Figure 2:
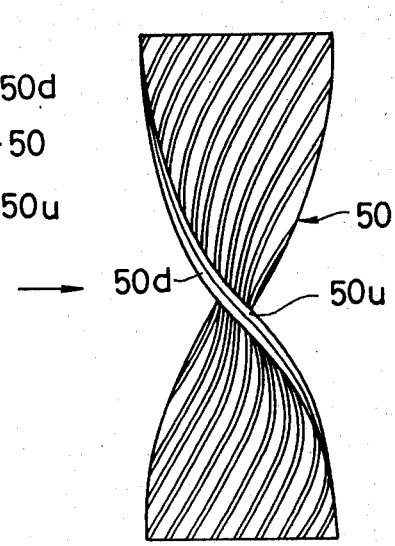
Figure 3:
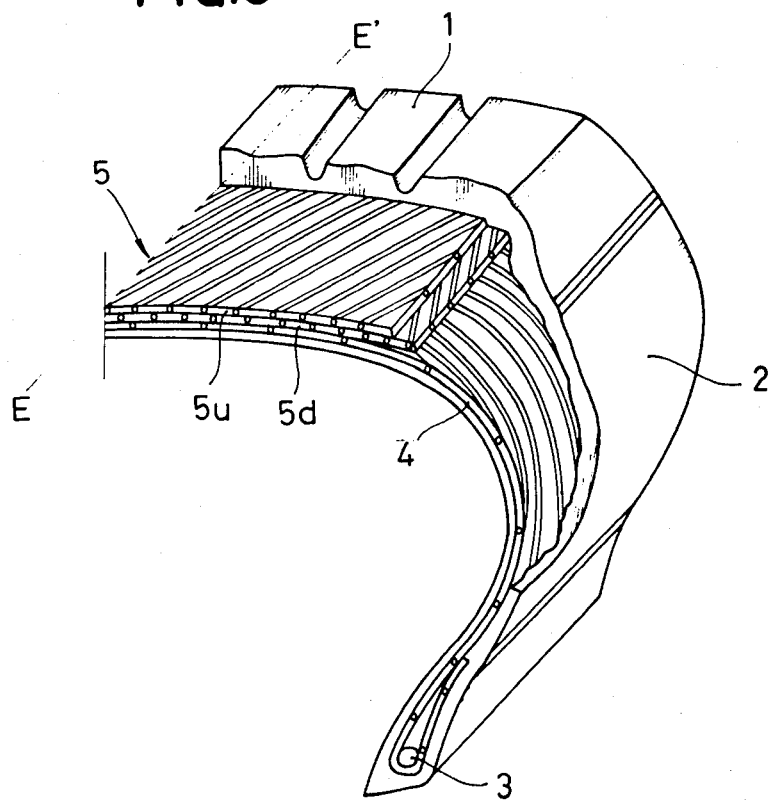
FIG. 3 is a semi-sectional perspective view of the pneumatic tire in accordance with an embodiment of the present invention.
Figure 4:
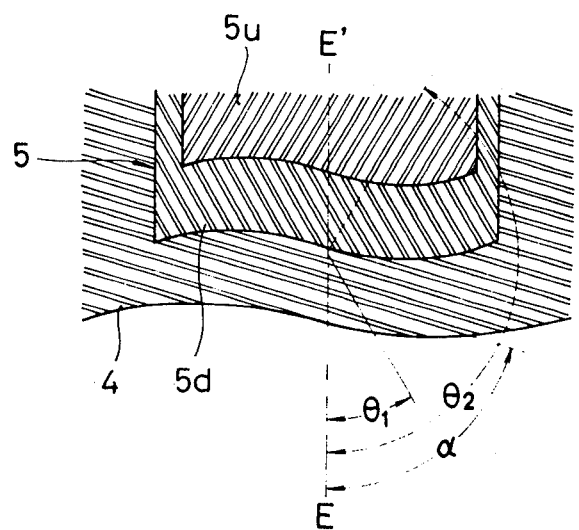
FIG. 4 is an exploded plan view showing some portions of the belt reinforcing layer and carcass cord layer of the pneumatic tire shown in FIG. 3.

FIG. 3 is a semi-sectional perspective view of the penumatic tire in accordance with the present invention and FIG. 4 is an exploded plan view of the belt reinforcing layers and carcass cord layer in the tire of FIG. 3.

In FIGS. 3 and 4, the reference numeral 1 represents the tread and reference numeral 2 denotes sidewalls that extend on both sides of the tread. Bead wires 3 are embedded in the lower end portions of these sidewalls in the circumferential direction. A carcass cord layer 4 is disposed in such a manner as to enclose the bead wires 3 at both end portions and to extend along the inner surfaces of the sidewalls 2 and tread 1. Between this carcass cord layer 4 and the tread 1 is interposed a belt reinforcing layer 5. The carcass cord layer 4 consists of only one layer whereas the belt reinforcing layer 5 has a two-layered laminate structure consisting of upper belt reinforcing layer 5u and lower belt reinforcing layer 5d.

Of the two layers forming the belt reinforcing layer 5, the reinforcing cord of the upper belt reinforcing layer 5u has an angle $\theta_2$ of from 150 to 165 degrees with respect to the tire circumferential direction EE' while the reinforcing cord of the lower belt reinforcing layer 5d likewise has an angle of 15 to 30 degrees with respect to the tire circumferential direction. The upper and lower belt reinforcing layers 5u and 5d are arranged so as to cross each other. The structure of the reinforcing cords in the belt reinforcing layer 5 is the same as that in the conventional radial tire.

The angle of the cord forming the carcass cord layer 4 with respect to the tire cirdumferential direction is one of the important structural factors for reducing the ply steer and must satisfy the following conditions.

Namely, the carcass cord layer 4 must be disposed in such a manner that the cord of the carcass cord layer 4 has an angle $\alpha$ of 66° to 82° with respect to the tire circumferential direction as measured from the side in which the lower belt reinforcing layer 5d of the two belt reinforcing layers 5u and 5d positioned on the contact side with respect to the carcass cord layer 4 has an acute angle with respect to the tire circumferential direction, and at the same time, the cord of this carcass cord layer 4 must cross the reinforcing cord of the lower belt reinforcing layer 5d in the same declining direction as the carcass cord with respect to the circumferential direction of the tire. Since the angle $\alpha$ is measured from the side in which the reinforcing cord of the lower belt reinforcing layer 5d on the contact side with the carcass cord layer 4 has an acute angle with respect to the tire circumferential direction, measurement must be made in the clockwise direction relative to the tire circumferential direction if the reinforcing cord of the lower belt reinforcing layer 5d is disposed leftwardly downward such as shown in FIG. 5.

Figure 5:
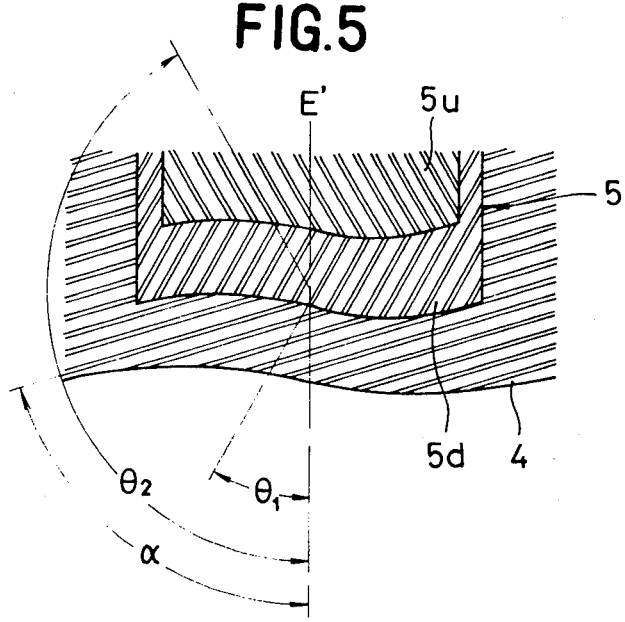
FIG. 5 is an exploded plan view showing some portions of the belt reinforcing layer and carcass cord layer of the pneumatic tire in accordance with another embodiment of the present invention.

Accordingly, as illustrated in FIGS. 4 and 5, both of the cord of the carcass cord layer 4 and the reinforcing cord of the lower belt reinforcing layer 5d are disposed so as to be declined to the same direction.

If the angle $\alpha$ of the cord of the carcass cord layer 4 is greater than 82 degrees, the ply steer cannot be improved as compared with the level of the radial tires and if it is smaller than 66 degrees, the ply steer itself can be improved but load durability is undesirably lowered. If the angle $\alpha$ falls within the range of 66 to 82 degrees, the ply steer can be improved as compared with the conventional radial tire in which $\alpha = 90$ degrees. Moreover, the impact force in the travelling direction can be minimized, the cornering power can be further increased and driving comfort and maneuvarability also improved.

Though the belt reinforcing layer 5 in the embodiment described above consists of a two-layered laminate structure of steel cords, one of the reinforcing layers may be a steel cord belt reinforcing layer with the other being an aramid belt reinforcing cord with the tradename "Kevlar". It is further possible to use ordinary belt reinforcing layers of the prior art such as one in which both layers consists of textile cords. It is of course possible to use a type in which the end portions of the belt reinforcing layers are folded inward. Depending upon the application, another or other textile belt reinforcing cords may be provided in addition to the above-mentioned two layers.

Hereinafter, the present invention will be explained in further detail with reference to definite examples thereof.

EXAMPLE 1

Various radial tires having the structures of the belt reinforcing layers and carcass cord layer shown in FIGS. 3 and 4 were produced while changing the angle $\alpha$ of the cord of the carcass cord layer within a range of from 58 to 122 degrees. The angles of the cords in the upper and lower layers of the belt reinforcing layer were 20° and 160°, respectively. The tire size was 175/70HR12 and the rim size, 5-J×12. The ply steer PS of each tire was measured in accord with the uniform test method for car tires JASO-C607, and the results are shown in FIG. 6.

Figure 6:
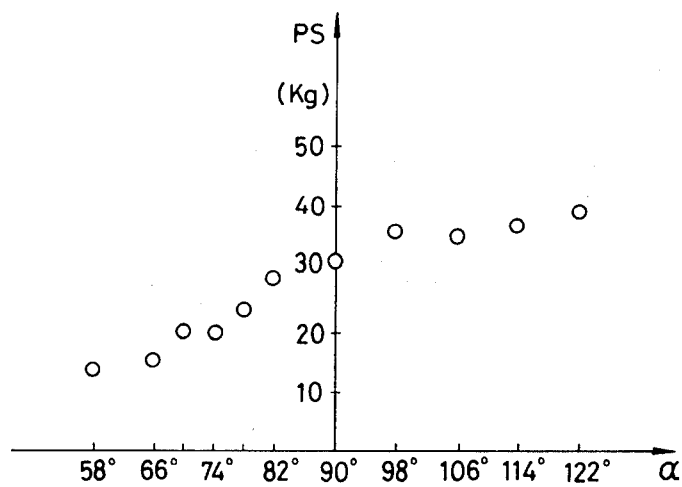
FIG. 6 is a diagram showing the relationship between the ply steer (PS) and the cord angle $\alpha$.

As is obvious from FIG. 6, those tires in which the cord angle $\alpha$ of the carcass cord layer was smaller than 82 degrees had reduced ply steer in comparison to the conventional radial tires in which $\alpha = 90°$. In other words, it can be seen that the straight driving performance was improved.

On the other hand, load durability of each radial tire was measured using an indoor drum tester consisting of a 1707 mm diameter drum. Each tire was driven at an air pressure of 2.1 kg/cm², a speed of 80 km/hr and initial load of 380 kg while increasing the load at the rate of 70 kg/5 hr until it was broken. The load at which each tire broke was recorded and is shown in FIG. 7.

Figure 7:
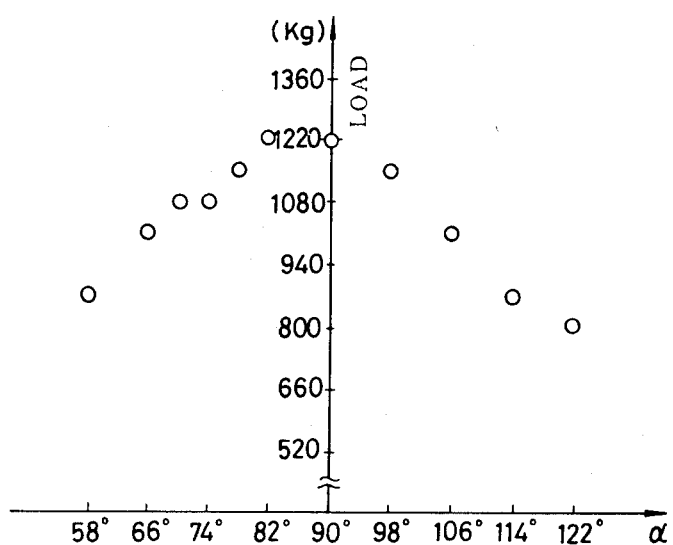
FIG. 7 is a diagram showing the relationship between the load and the cord angle $\alpha$.

As is obvious from FIG. 7, the load durability dropped when the cord angle α of the carcass cord layer became smaller than 66 degrees.

EXAMPLE 2

In order to evaluate the driving comfort, impact force in the running direction of the tire when driving over a protuberance was measured for radial tires having the same construction as each of those in Example 1 with an indoor drum tester consisting of a 2,500 mm diameter drum equipped with a semi-circular protuberance of a 10 mm radius in the axial direction of the drum around its circumference. The results are shown in FIG. 8.

Figure 8:
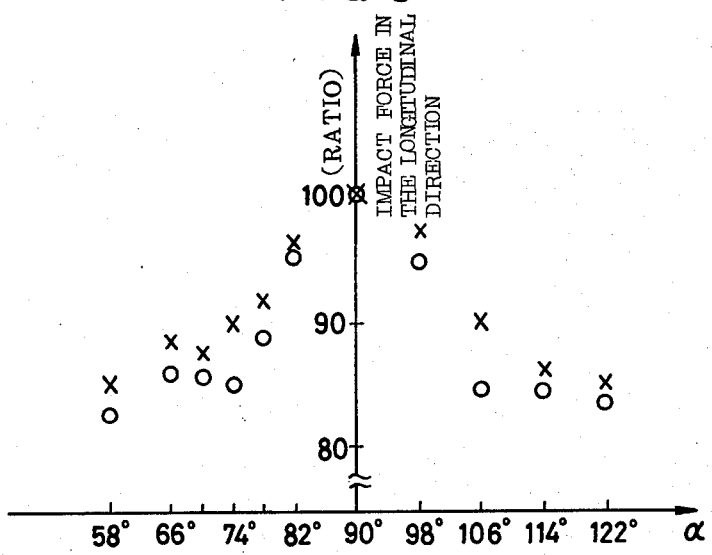
FIG. 8 is a diagram showing the relationship between the impact force in the longitudinal direction of the tire and the cord angle $\alpha$.

In FIG. 8, symbol X represents the average values as measured at an air pressure of 1.9 kg/cm$^2$, load of 380 kg and speeds of 30, 40 and 50 km/hr. Symbol O represents the average value as measured at the same air pressure and load and the speeds of 50, 60 and 70 km/hr, respectively. These values are expressed in terms of their ratio to the impact force in the travelling direction of the conventional radial tire with α=90° being 100 as the reference.

As is obvious from FIG. 8, the tires of the present invention having a cord angle α of the carcass cord layer ranging from 66 to 82 degrees exhibit a reduced impact force in the travelling direction of the tire and thus provide better driving comfort in comparison with the conventional radial tires.

EXAMPLE 3

The cornering force, when a slip angle of 2° was applied, was measured for each of radial tires having the same construction as those of Example 1 at an air pressure of 1.9 kg/cm$^2$ and a load of 380 kg, using an indoor drum tester consisting of a 2,500 mm diameter drum. Each cornering force thus obtained was divided by 2 to obtain the cornering power. Each measured value was expressed in terms of its ratio to the measured value of the conventional radial tire having α=90° being 100 as the reference. The results are plotted in FIG. 9.

Figure 9:
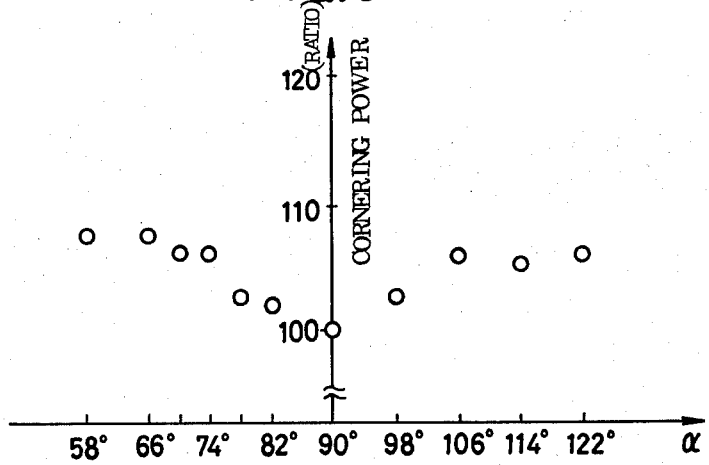
FIG. 9 is a diagram showing the relationship between the cornering power and the cord angle $\alpha$.

As is obvious from FIG. 9, the radial tires in accordance with the present invention in which the cord angle α of the carcass cord layer was from 66° to 82° had greater cornering power and better maneuverability than those of the conventional radial tires.

As described in the foregoing, in a pneumatic tire having a construction in which at least two belt reinforcing layers, one having a reinforcing cord angle of 15° to 30° with respect to the tire circumferential direction and the other having a reinforcing cord angle of 150° to 165° with respect to the tire circumferential direction, are disposed between a tread and a carcass cord layer, the pneumatic tire in accordance with the present invention has a construction such that the carcass cord layer consists of only one layer and the reinforcing cord for reinforcing the carcass cord has an angle of 66 to 82 degrees with respect to the tire circumferential direction when measured from the side in which the angle of the reinforcing cord of the belt reinforcing layer on the contact side with the carcass cord layer has an acute angle with respect to the tire circumferential direction. This arrangment reduces the ply steer resulting from the belt reinforcing layers and improves the straight driving performance as compared with the conventional radial tires. Moreover, the driving comfort as well as maneuverability can also be improved.

What is claimed is:

1. In a pneumatic tire comprising a tread, a carcass cord layer and at least two belt reinforcing layers disposed between said tread and said carcass cord layer, the reinforcing cord of one of said belt reinforcing layers having an angle of 15° to 30° with respect to the circumferential direction of said tire and the reinforcing cord of the other of said belt reinforcing layers having an angle of 150° to 165° with respect to the circumferential direction of said tire, the improvement wherein said carcass cord layer consists of only one layer, and the reinforcing cord of said carcass cord layer is disposed in such a relation as to cross the reinforcing cord of said belt reinforcing layer adjacent said carcass cord layer and to have an angle of 66° to 82° with respect to the circumferential direction of said tire when measured from the side in which the angle of the reinforcing cord of said belt reinforcing layer adjacent said carcass cord layer has an acute angle with respect to the circumferential direction of said tire.

2. The pneumatic tire as claimed in claim 1, wherein said belt reinforcing layers consist of a two-layered steel cord belt reinforcing layers.

3. The pneumatic tire as claimed in claim 1, wherein said belt reinforcing layers consists of a two-layered structure, one of said two layers is a steel cord belt reinforcing layer disposed adjacent to said carcass cord layer and the other is an aramid cord belt reinforcing layer and disposed on said steel belt reinforcing layer.

4. The pneumatic tire as claimed in claim 3, wherein both end portions of said aramid cord belt reinforcing layer are bent towards the center of the circumferential direction of said tire.

* * * * *